United States Patent
Lenkl

(10) Patent No.: US 8,899,288 B2
(45) Date of Patent: Dec. 2, 2014

(54) COUPLING FOR MOUNTING A LABELING MACHINE AND METHOD OF ADJUSTING A LABELING MACHINE

(75) Inventor: Johannes Lenkl, Freising (DE)

(73) Assignee: Avery Dennison Corporation, Glendale, CA (US)

( * ) Notice: Subject to any disclaimer, the term of this patent is extended or adjusted under 35 U.S.C. 154(b) by 164 days.

(21) Appl. No.: 13/511,387

(22) PCT Filed: Dec. 30, 2009

(86) PCT No.: PCT/US2009/069769
§ 371 (c)(1),
(2), (4) Date: May 23, 2012

(87) PCT Pub. No.: WO2011/081624
PCT Pub. Date: Jul. 7, 2011

(65) Prior Publication Data
US 2012/0279665 A1 Nov. 8, 2012

(51) Int. Cl.
| | |
|---|---|
| *F16C 11/00* | (2006.01) |
| *B65C 9/00* | (2006.01) |
| *B65C 1/02* | (2006.01) |
| *A43D 21/12* | (2006.01) |
| *A43D 21/02* | (2006.01) |
| *F16D 1/10* | (2006.01) |
| *B21D 39/02* | (2006.01) |
| *B29C 49/42* | (2006.01) |

(52) U.S. Cl.
CPC ... *B65C 1/02* (2013.01); *B65C 9/00* (2013.01); *A43D 21/12* (2013.01); *A43D 21/02* (2013.01); *F16D 1/101* (2013.01); *B21D 39/021* (2013.01); *B29C 49/4205* (2013.01)

USPC ............ 156/349; 403/60; 403/79; 403/109.5; 403/113; 403/116; 403/119; 248/274.1; 248/288.11; 248/292.14; 248/309.1; 248/309.2

(58) Field of Classification Search
CPC .. B21D 39/021; F16D 1/101; B29C 49/4205; A43D 21/02; A43D 21/12
USPC ............... 156/60; 248/274.1, 288.11, 292.14, 248/309.1, 309.2; 403/60, 79, 109.5, 113, 403/116, 119
See application file for complete search history.

(56) References Cited

U.S. PATENT DOCUMENTS

| | | | |
|---|---|---|---|
| 3,301,733 | A | 1/1967 | West et al. |
| 3,352,580 | A | 11/1967 | Helene et al. |
| 4,032,386 | A | 6/1977 | Fleet |
| 4,373,984 | A | 2/1983 | Hawkins |

(Continued)

FOREIGN PATENT DOCUMENTS

| | | |
|---|---|---|
| DE | 2435469 | 2/1976 |
| DE | 4217655 | 2/1993 |

(Continued)

*Primary Examiner* — Jeff Aftergut
*Assistant Examiner* — Joshel Rivera
(74) *Attorney, Agent, or Firm* — Avery Dennison Corporation

(57) ABSTRACT

A coupling capable of adjustably cantilever-mounting a machine such as a labeling machine to a mounting structure, wherein the attitude or inclination of the machine to other machinery such as a conveyor can be precisely adjusted. Also, there is a method a mounting a machine to mounting structure with the capability to adjust the inclination of the machine that requires only one person.

9 Claims, 9 Drawing Sheets

(56) References Cited

U.S. PATENT DOCUMENTS

| | | |
|---|---|---|
| 4,390,390 A | 6/1983 | Margraf et al. |
| 4,479,839 A | 10/1984 | Tasma |
| 4,574,027 A | 3/1986 | Weinundbrot |
| 4,624,734 A | 11/1986 | Voltmer et al. |
| 4,787,953 A | 11/1988 | Trouteaud et al. |
| 5,264,066 A | 11/1993 | Lundell |
| 5,421,948 A | 6/1995 | Crankshaw et al. |
| 5,472,552 A | 12/1995 | Speranza et al. |
| 5,564,668 A | 10/1996 | Crowe |
| 5,645,669 A | 7/1997 | Crankshaw et al. |
| 5,853,530 A | 12/1998 | Allen |
| 6,352,094 B1 | 3/2002 | Gunderson et al. |
| 6,412,535 B1 | 7/2002 | Barilovits et al. |
| 6,913,662 B2 | 7/2005 | Barilovits et al. |
| 7,252,131 B2 | 8/2007 | Draghetti et al. |
| 2004/0074582 A1 | 4/2004 | Davis et al. |
| 2005/0236112 A1 | 10/2005 | Barilovits et al. |
| 2007/0193325 A1* | 8/2007 | Matsumoto .............. 72/312 |

FOREIGN PATENT DOCUMENTS

| | | |
|---|---|---|
| DE | 19816239 | 10/1999 |
| EP | 0370633 | 5/1990 |
| EP | 0506597 | 9/1992 |
| EP | 0980832 | 2/2000 |
| GB | 2067530 | 7/1981 |
| GB | 2158186 | 11/1985 |
| JP | 2002059056 | 2/2002 |
| JP | 2004262520 | 9/2004 |
| JP | 2004352256 | 12/2004 |
| WO | 93/08081 | 4/1993 |
| WO | 98/25038 | 6/1998 |
| WO | 2008/066383 | 6/2008 |

\* cited by examiner

COUPLING FOR MOUNTING A LABELING MACHINE AND METHOD OF ADJUSTING A LABELING MACHINE

CROSS-REFERENCE TO RELATED APPLICATION

The present application is a 371 of International Application No. PCT/US2009/069769, which was published in English on Jul. 7, 2011, which is related to U.S. patent application Ser. No. 12/100,553, filed Apr. 10, 2008, which is incorporated herein by reference in its entirety.

FIELD OF THE INVENTION

This disclosure relates to adjustable couplings, to a combination coupling and a machine such as labeling machine, to method of adjusting such a machine, and to method of mounting such a machine.

BRIEF DESCRIPTION OF THE PRIOR ART

In one prior art coupling for mounting a labeling machine it required two people to adjust the labeling machine relative to another machine such as a conveyor.

A typical prior art labeling machine useful with the present disclosure is disclosed in U.S. application Ser. No. 12/100,553

A typical prior art support or mounting structure is designated 100 in the drawings.

SUMMARY OF THE INVENTION

There is disclosed an improved coupling which overcomes the disadvantage cited above, which is capable of mounting and adjusting a machine relating to another structure, and wherein the adjustment in infinite over a range.

According to a specific embodiment, there is provided a coupling including a first coupling part or element, a second coupling part or element, a pivot pin connecting the first and second coupling elements for pivotal movement relative to each other, and a cam to vary the amount of relative pivotal movement between the first and second coupling elements. The first coupling element can comprise a clevis. The first coupling element can be generally U-shaped and can include a pair of arms and a bight portion connecting the arms. The second coupling element can include a coupling portion disposed between the arms. The pivot pin can extend through the coupling portion and into the arms. The cam can be received by the first coupling element and can act on the second coupling element to define a selected stop position for the first and second coupling elements relative to each other. The cam can include a pair of relatively movable cam elements received in aligned bores in the first coupling element and a screw acting on the cam elements can cause the cam elements to move selectively toward or away from each other. The screw can extend into both cam elements. The arms can have aligned holes to slidably receive the cam elements, wherein the screw can pass through both the cam elements, and wherein rotation of the screw in one direction can cause the cam elements to move toward each other and rotation of the screw in the opposite direction can enable the cam elements to move away from teach other, wherein the second coupling element can include a cam surface cooperable with the cam elements, and wherein the second coupling element includes a cam surface cooperable with the cam. There is a structure to cantilever-mount the coupling, the structure can be rigidly secured to the second coupling element, a machine can be rigidly secured to the first coupling element, and a conveyor can carry items to be labeled, wherein the machine can comprise a label applicator to apply labels to the items, and wherein the cam is operable to vary the inclination of the label applicator relative to the conveyor.

According to a specific embodiment of a method there can be steps of adjusting a label applicator, providing a mounting structure, a coupling mounted to the structure, and a label applicator cantilever-mounted to the coupling, wherein the coupling includes coupling elements and a cam to vary the stop positions of the coupling elements relative to each other, and moving the cam to vary the inclination of the label applicator. The label applicator can be disposed over a conveyor, and wherein movement of the cam causes the inclination of the label applicator relative to the conveyor to vary.

According to a specific embodiment of a method of mounting a machine to a structure there can be steps of a providing a machine, a mounting structure, and a coupling to couple the machine to the structure, wherein the coupling includes a first coupling element, a second coupling element, and a cam, of the coupling operable to vary the inclination of the machine, securing the first coupling element to the machine, articulating the second coupling element to the first coupling element, moving the machine and the coupling relative to the mounting structure to mount the coupling to the machine with the machine in approximate orientation to the mounting structure, and thereafter moving the cam to adjust the orientation of the machine. The method can further use a conveyor, wherein the cam is moved to adjust the machine relative to the conveyor.

BRIEF DESCRIPTION OF THE DIAGRAMMATIC DRAWINGS

Figure 4:
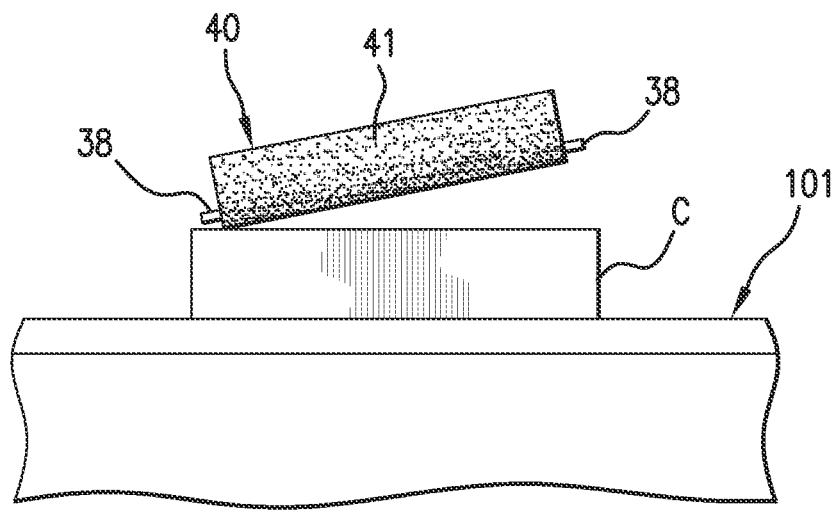
FIG. 4 is a fragmentary, simplified front elevational view of an applicator and the delaminator of the machine which are out of alignment or skewed in one direction with respect to the conveyor and a carton disposed on the conveyor.
Figure 5:
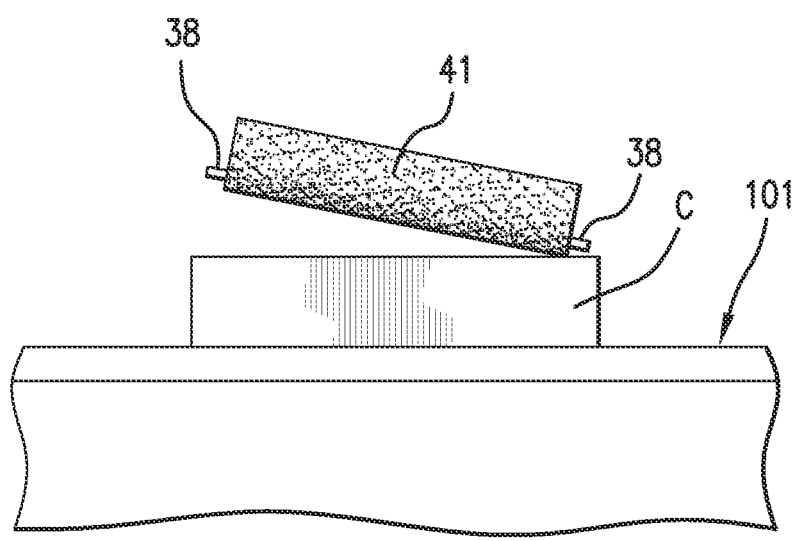
Figure 6:
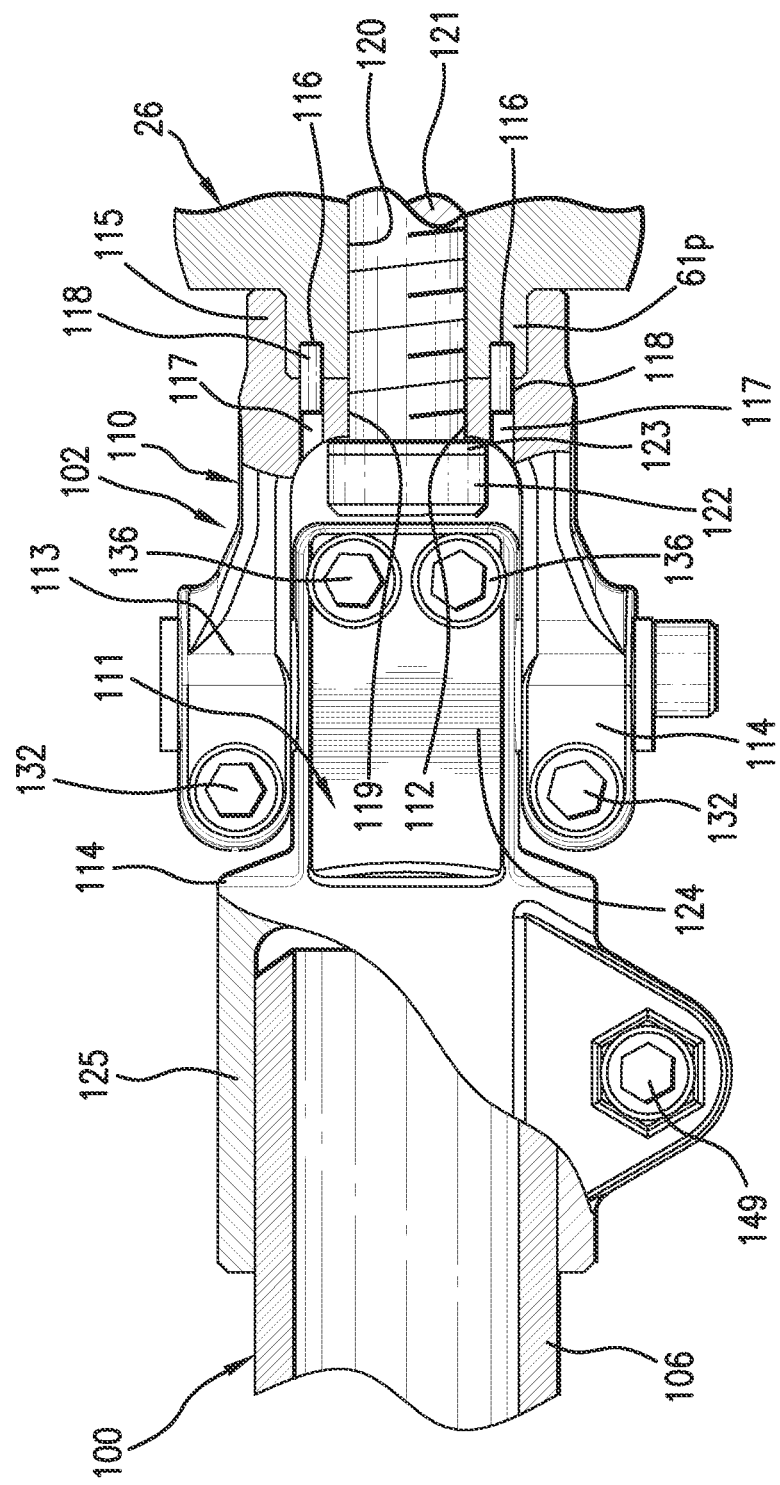
Figure 7:
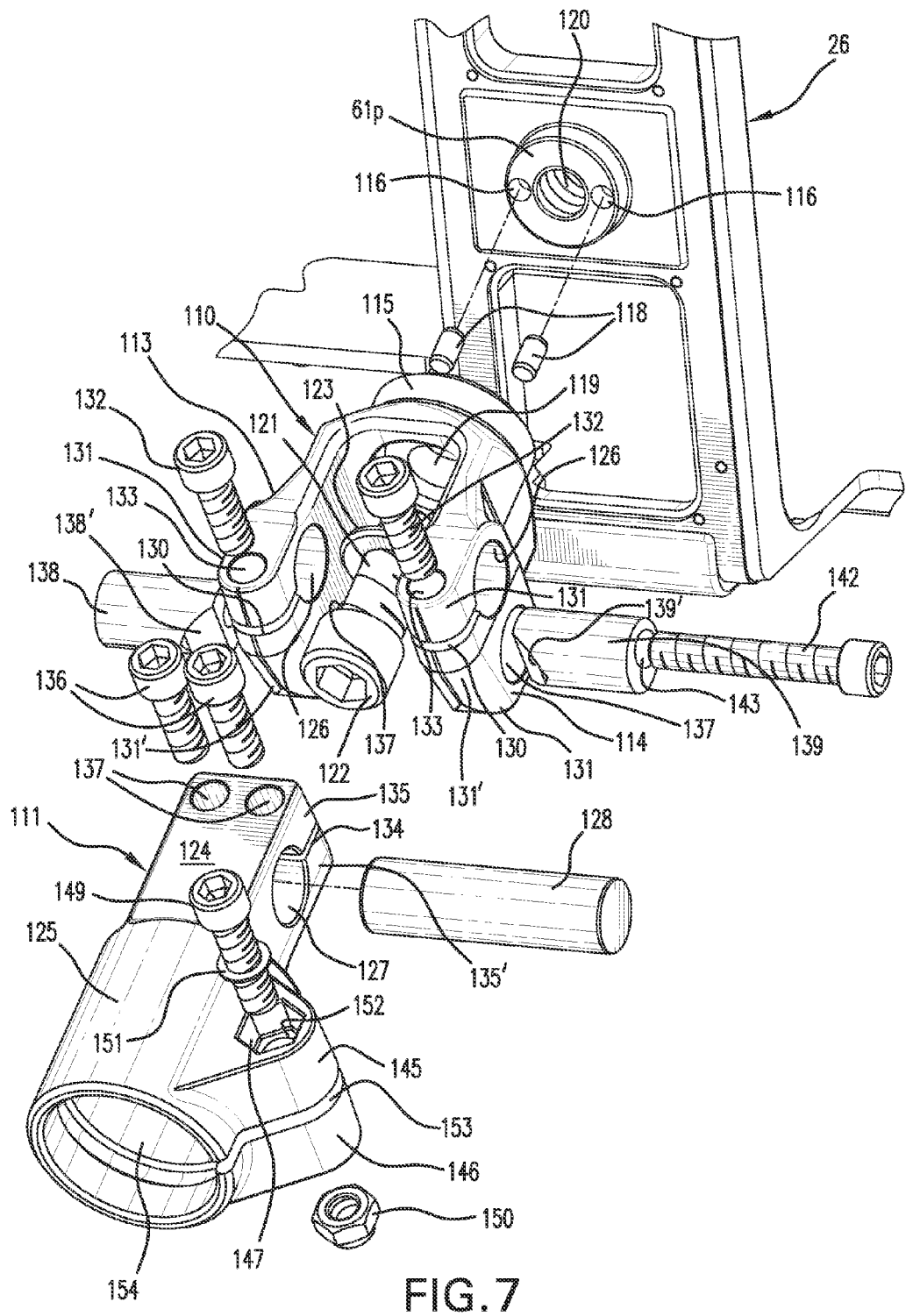
Figure 8:
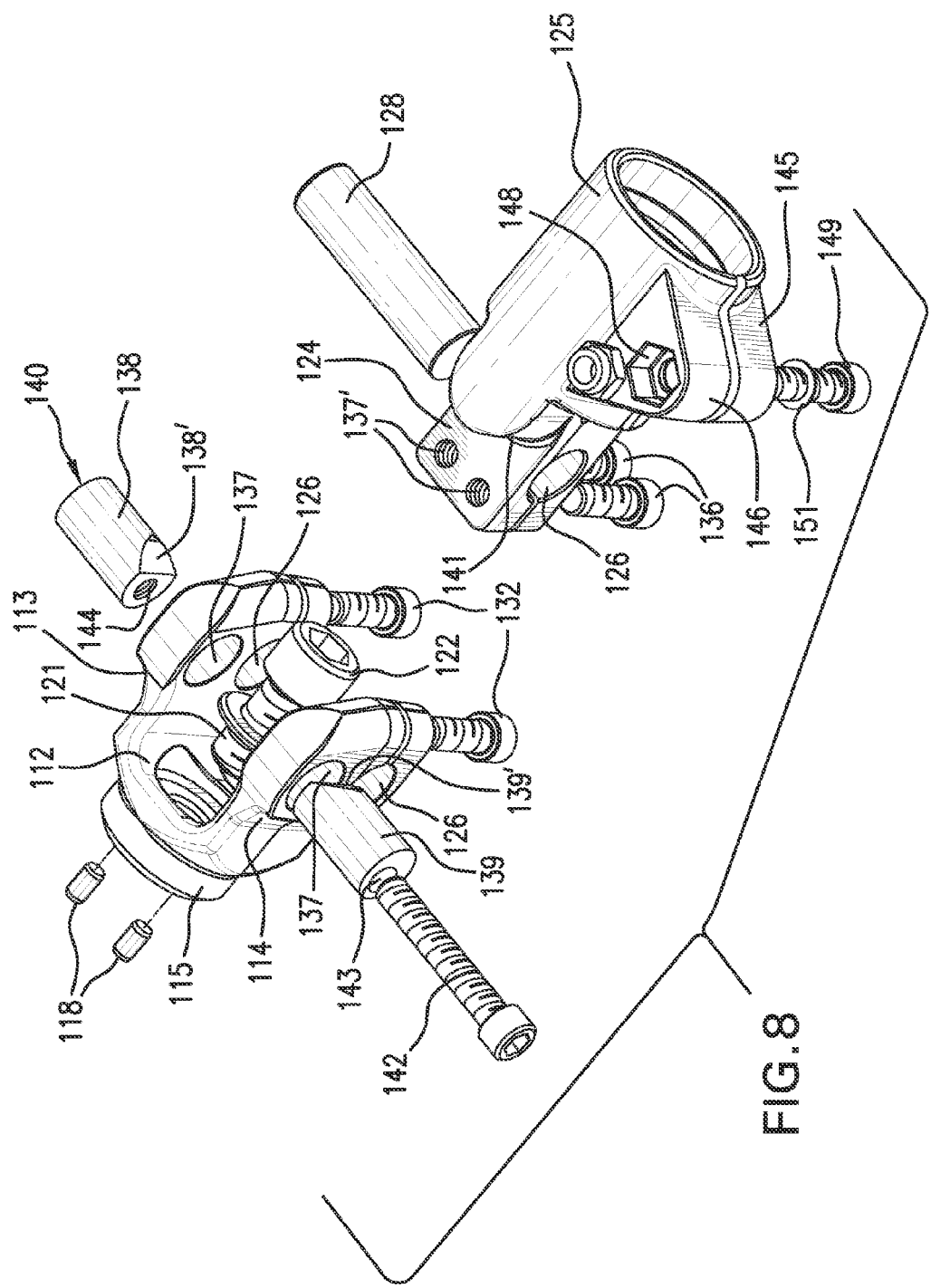
Figure 9:
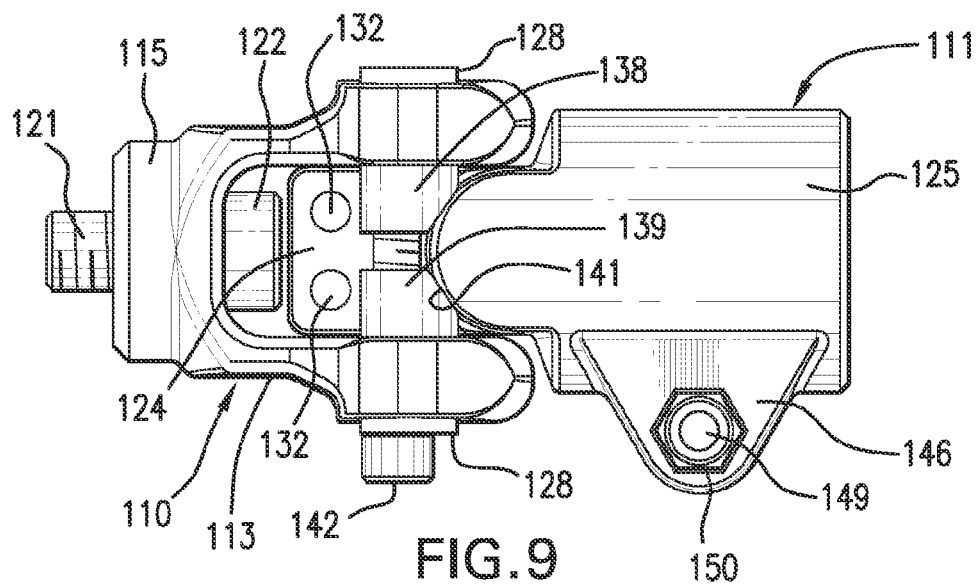
Figure 10:
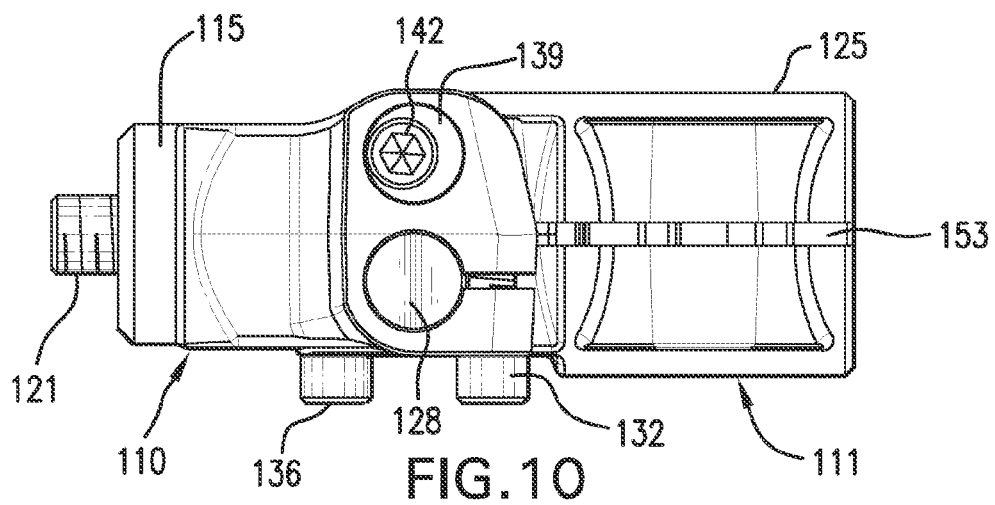
Figure 11:
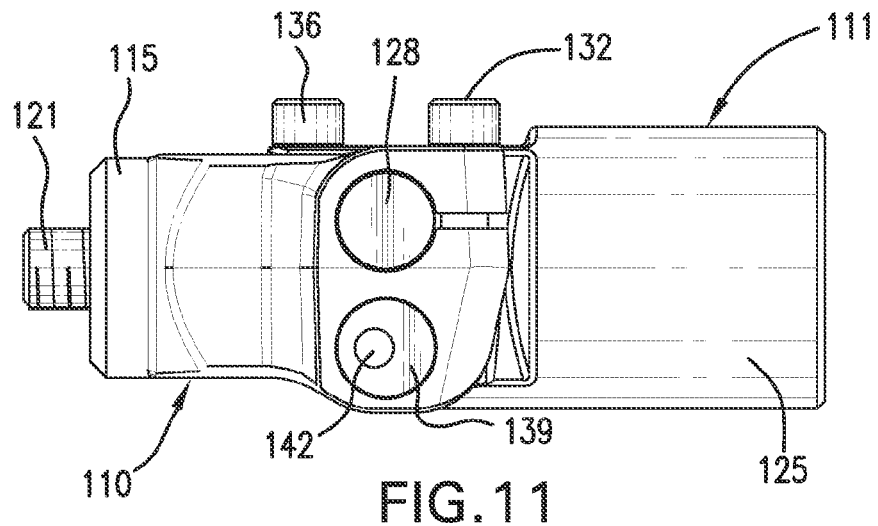
Figure 12:
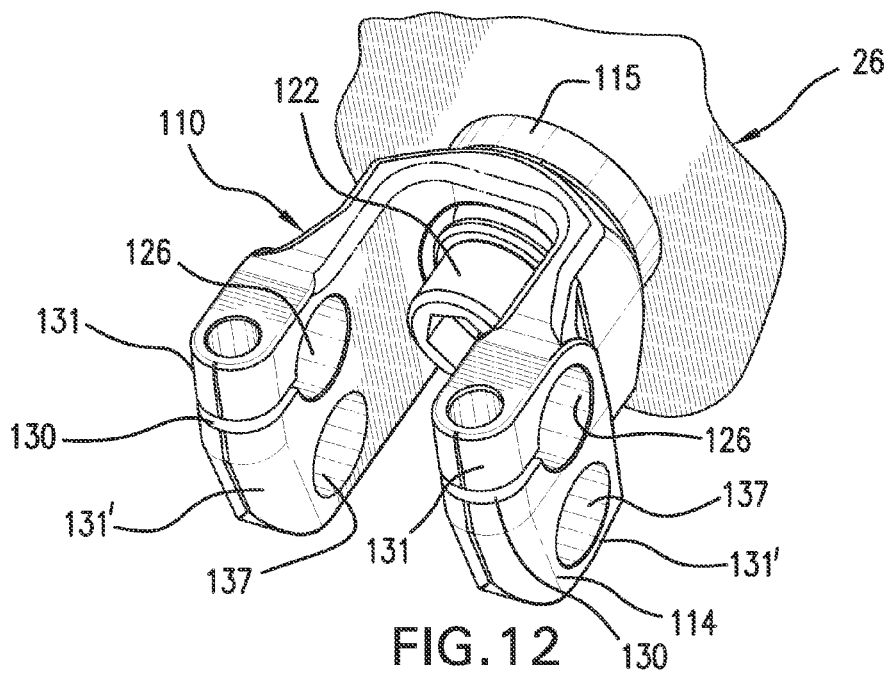
Figure 13:
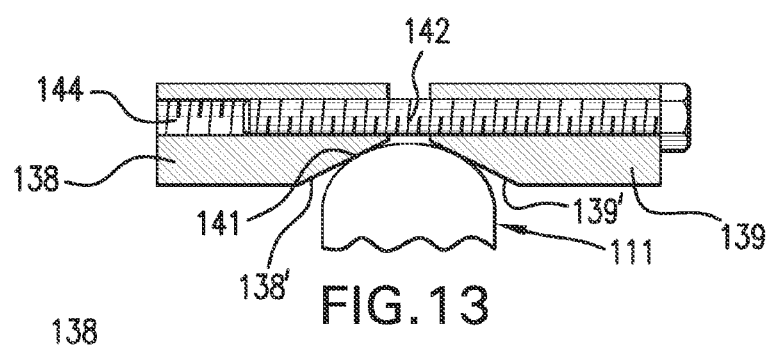
Figure 14:
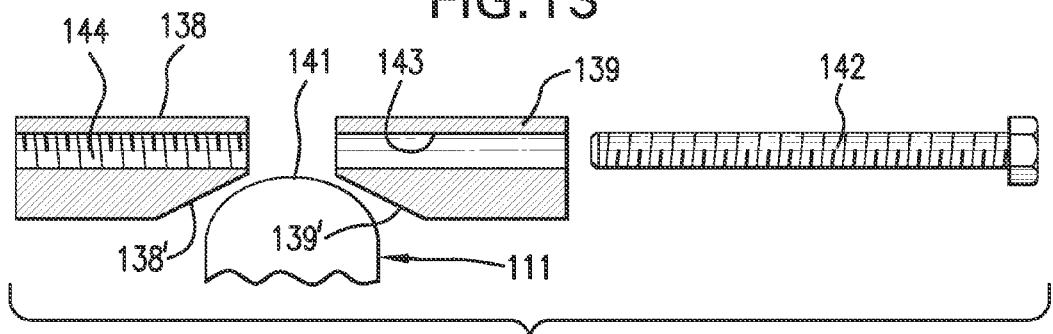

FIG. 5 fragmentary, simplified front elevational view of an applicator and the delaminator of the machine which are out of alignment or skewed in the opposite direction from the direction shown in FIG. 4;

FIG. 6 is top plan, partly sectional view of the coupling secured to the frame of the machine and to support structure;

FIG. 7 is an exploded pictorial view of the coupling and the frame;

FIG. 8 is an exploded pictorial view of the underside of the coupling;

FIG. 9 is an assembled bottom plan view of the coupling;

FIG. 10 is an assembled right side elevational view of the coupling;

FIG. 11 is an assembled left side elevational view of the coupling;

FIG. 12 is a pictorial view of the frame and a first part of the coupling bolted to the frame;

FIG. 13 is a fragmentary view showing the action of cam elements of a cam on a second part of the coupling; and FIG. 14 is an exploded fragmentary view showing the relationship of the screw to the cam elements and the second part of the coupling.

DETAILED DESCRIPTION OF THE PREFERRED EMBODIMENTS

Figure 1:
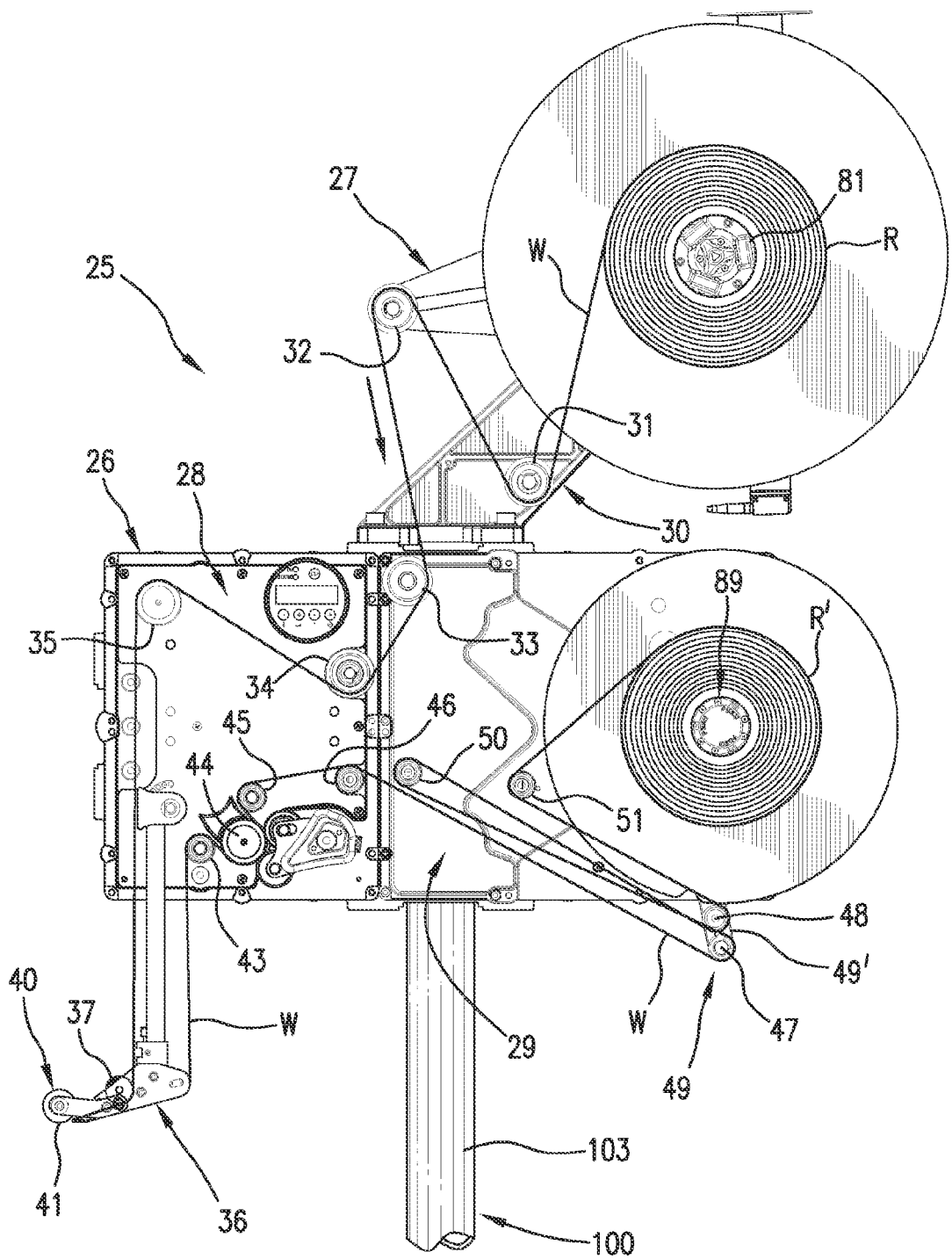
FIG. 1 is a side elevational of an exemplary machine, namely, a labeling machine supported on a mounting structure.
Figure 2:
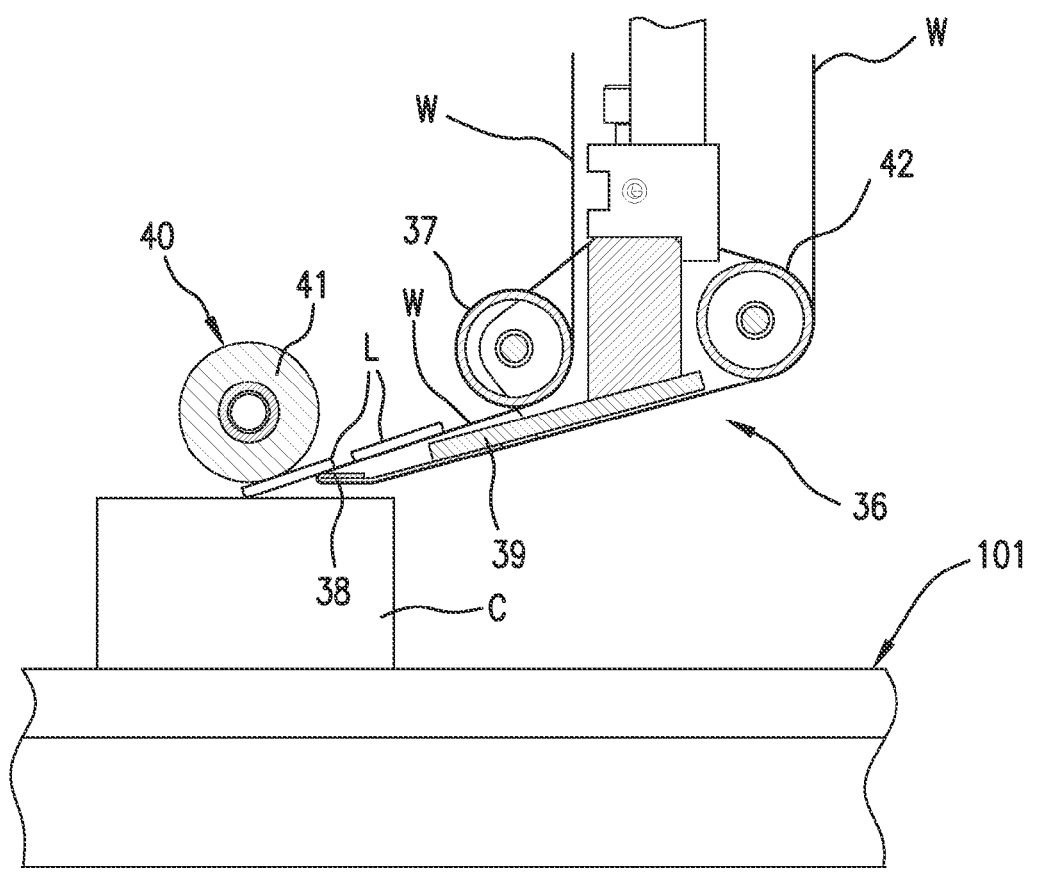
FIG. 2 is an enlarged fragmentary view of the dispensing assembly shown in FIG. 1 applying a label to a carton on a conveyor.

With references to FIGS. 1 and 2, there is shown an exemplary machine such as a labeling machine 25 of the construction disclosed in U.S. application Ser. No. 12/100,553 to which reference may be had for additional details. The same reference characters are used in the present application to designate corresponding components as are used in application Ser. No. 12/100,553. Components of the present application that relate to components not found in application Ser. No. 12/100,553 start with reference character 100. While the machine 25 is illustrated to be a particular labeling machine, the machine can be other and different labeling machines, and if desired they can be machines that are not labeling machines. Also, the machine 25 can include a printer or print engine, if desired.

The illustrated machine 25 is shown to be mounted on mounting or support structure generally indicated at 100. The machine has a frame 26 that mounts an applicator or dispenser assembly or module 28, a rewind or rewind module 29 and a support arm 30. The support arm 30 mounts a label web tension control assembly 27 having a hub 81 for a label supply roll R. A web W is paid out from the roll R and passes partly about direction-changing rolls 31, 32, 33 and 34 partly about a driven roll 35, partly about a direction-changing roll 37 and undergoes a sharp change in direction as it passes around a delaminator 38 (FIG. 2) where labels L are successively delaminated or peeled off as the web W advances. The labels L are dispensed into underlying, label-applying relationship with respect to an applicator 40 which may be in the form of an applicator roll 41. FIG. 2 shows the leading label L being applied to a carton C moving along a conveyor 101. The spent web W passes from the delaminator 38 partially around direction-changing rolls 42 and 43, partly around a driven roll 44, partly around direction-changing rolls 45 and 46 to a dancer 49. The dancer 49 includes a dancer art 49' that carries direction-changing rolls 47 and 48. The spent web W passes partly around direction-changing rolls 47, 50, 48 and 51 in sequence and is rewound on a roll mounting assembly 89 onto a take-up roll R'.

Figure 3:
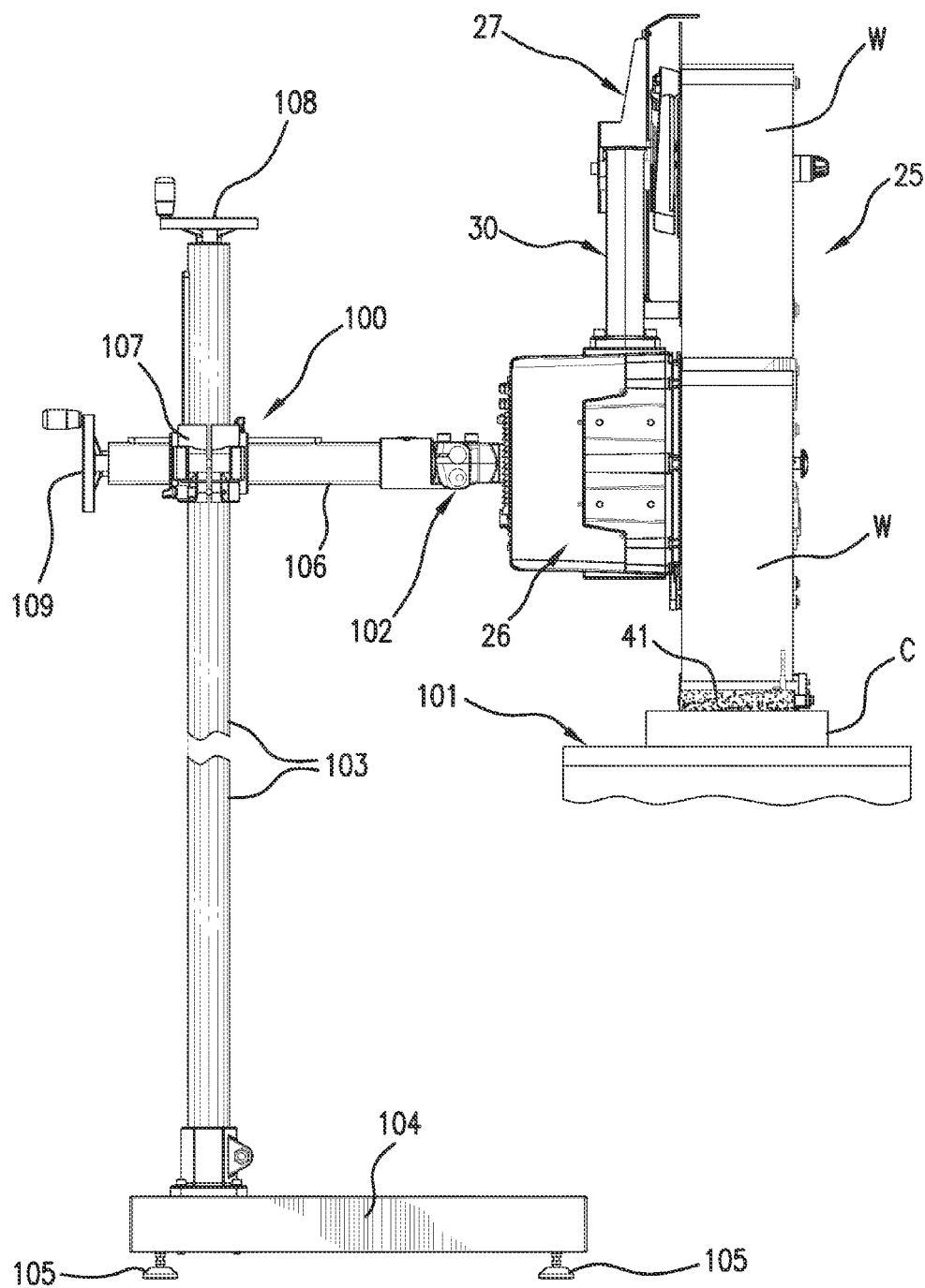
FIG. 3 is a front elevational view of the machine shown in FIGS. 1 and 2 on a mounting structure, wherein the machine is perfectly aligned with a conveyor and a carton disposed on the conveyor.

With reference to FIG. 3, the machine 25 is shown to be mounted square or aligned with respect to the conveyor 101 by the mounting structure 100 and a coupling 102. The structure 100 includes a post or upright 103 which is generally vertical and is secured to a base 104 having adjustable feet 105. The mounting structure 100 also includes a generally horizontal member 106 to which the coupling 102 is cantilevered. In turn, the machine 25 is cantilevered to the coupling 102. The member 106 is coupled to the post 103 by a right-angle coupling 107. The post 103 and the member 106 are preferably tubular for light weight and strength. The machine 25, the member 106 and the coupling 102 can be raised and lowered as a unit by turning a hand wheel 108, and the machine 25, the member 106 and the coupling 102 can be moved generally horizontally relative to the post 103 and the conveyor 101 by turning a hand wheel 109. The applicator roll 41 is shown to be in parallel alignment to the carton C and the conveyor 101 in FIGS. 2 and 3. Although the delaminator 38 is not shown in FIG. 3, the delaminator 38 is also in parallel alignment with the carton C and the conveyor 101. Thus, it can be expected that labels L will be correctly applied to the carton. Even though some labeling machines do not have applicator rolls but instead have reciprocating presser feet, they do have delaminators which should be in parallel alignment with the carton C to which the label L is to be applied. So in any event, the machine 25 or at least its delaminator 38 are preferably square with the item to be labeled. It should be understood that even though the post 103 is generally vertical and the member 106 is generally horizontal, the fact alone that the machine 25 is cantilevered means that there will be some deflection of the post 103 and the member 106. Accordingly, the coupling 102 is used not only to connect or secure the machine 25 to the structure 100, but to adjust the machine 25 so that at least the delaminator 38 and also the applicator roll 41 (if there is one) should be true or parallel to the item to be labeled as shown in FIG. 3.

FIGS. 4 and 5 are views looking at the front of the machine 25 as viewed in FIG. 3. FIGS. 4 and 5 show the conditions exaggerated for clarity that can exist when the machine 25 is mounted on the mounting structure 100 without the machine being precisely adjusted. In particular, FIGS. 4 and 5 show the applicator roll 41 and show the delaminator 38 behind the applicator roll 41. As shown in FIG. 2, the delaminator 38 is behind the applicator roll 41. The delaminator 38 is shown to be slightly wider than the applicator roll 41 in FIGS. 4 and 5 for clarity of illustration. FIG. 4 shows the applicator roll 41 and the delaminator 38 at an angle or skewed exaggeratedly in one direction relative to the carton C and the conveyor 101, and FIG. 5 shows the applicator roll 41 and the delaminator 38 at an angle or skewed exaggeratedly in the opposite direction relative to the carton C and the conveyor 101.

By use of the coupling 102 the machine can be mounted to the structure by one person so that the platen roll 41 and the delaminator 38 are in approximate alignment or square with the conveyor 101 and items to be labeled that are on the conveyor 101, and the coupling 102 is used to precisely adjust the inclination of the machine 25 and in particular the delaminator 38 and any applicator roll which the machine may have. In general, the coupling 102 illustrated in the drawings has a range of adjusting sufficient to take care of situations that may occur. Accordingly, by way of any example, not limitation, the coupling 102 may readily adjust the machine 25 and its components such as the delaminator 38 and the applicator roll 41 plus or minus four degrees with respect to the horizontal. However, the range can be expanded by changing certain dimensions, if desired.

With reference to FIG. 6, the coupling 102 is shown to be cantilevered on the generally horizontal member 106 of the mounting structure 100. The coupling 102 is shown to have a first coupling part or element 110 and a second coupling part or element 111 articulated to each other. The first coupling part 110 includes a bight portion 112 jointed integrally to a pair of spaced arm portions 113 and 114. The bight portion 112 has a collar or tubular flange 115 which makes a slidable fit over a boss or pad 61p of the machine frame 26. Holes 116 in the boss 61p and holes 117 in the first coupling part 110 are shown to receive aligning pins 118. The holes 116 and 117 and the pins 118 are preferably horizontally aligned. While the holes 116 and 117 and the pins 118 received thereby are shown to be 180 degrees apart, they can be spaced by other than 180 degrees if desired. The first coupling part 110 has a through hole or bore 119 which is aligned with a threaded hole 120 in the frame. A bolt or machine screw 121 having a head 122 passes through the hole 119 and is threadably received in the threaded hole 120. The head 122 bears against a washer 123 which in turn bears against the bright portion 112. The first coupling part 110 is illustrated as taking the form of a clevis. The second coupling part 111 includes a projection or a projection or coupling portion 124 straddled by the arm portions 113 and 114 of the first coupling part 110. The projection 124 is shown integrally joined to a connecting portion in the form of a tube 125 which can slidably receive the member 106. Although the connection of the first coupling part 110 to the frame 26 and the connection of the second coupling part 111 to the structure 100 are shown and described in considerable detail, these connections can take any suitably form or construction. For example, the second coupling part 110 can be constructed to be bolted directly to a substantially rigid structure other than the mounting structure 100. Also, the positions of the coupling parts can be reversed, namely, the second coupling part 111 can be suitably secured to a machine such as the machine 25 and the first coupling part 110 can be suitably secured to a substantially rigid structure.

With reference to FIG. 7, the first coupling part 110 has a pair of axially aligned holes or bores 126. The projection 125 of the second coupling part 111 has a hole or bore 127 which is axially aligned with the holes 126. A pivot or pin or pivot pin 128 extends through the holes 126 and the hole 127 so that the first and second coupling parts 110 and 111 are articulated to each other, and more specifically the first and second coupling parts are pivotal relative to each other about the pivot pins 128. The leg portions 113 and 114 are split and have respective slots 130 that open into the respective holes 126. The slots 130 and the respective holes 126 make a pair of generally C-shaped arrangements having pairs of spaced members 131 and 131' (FIG. 12). Socket-headed machine screws 132 pass through respective holes 133 and the slots 130 and are threadably received in the leg portions 113 and 114. The screws 132 are tightened or loosened to the desired degree to adjust the fit between the holes 126 and the pin 128.

The projection 124 of the second coupling part 111 has a slot 134 that opens into the hole 127 to make a C-shaped arrangement having a pair of spaced members 135 and 135'. Socket-headed machine screws 136 pass through respective holes 137 in the member 135 and are threadably received in threaded holes 137' (FIG. 8) in the member 135'. The screws 136 can be tightened or loosened to the desired degree to adjust the fit between the hole 127 and the pin 128.

If desired, the screws 132 could be tightened to such a degree that the pin 128 does not rotate. In effect the pin 128 is thus clamped against rotation to the first coupling part 110. With this clamped position the screws 136 are only tightened to such a degree that the second coupling part can rotate about the pin 128 relative to the first coupling part 110. Vice versa, the screws 136 can be tightened so that the pin 128 is clamped in the hole 127 to the projection 124, and the screws 132 can be loose enough to enable relative movement of the first coupling part 110 about the pin 128. Alternatively, the screws 132 and 136 can be tightened so that both the first and second coupling parts 110 and 111 can rotate relative to the pin 128. It is only necessary that the first and second coupling parts 110 and 111 can articulate or pivot relative to teach other. When the machine such as the machine 25 is mounted on the mounting structure such as the mounting structure 100 as shown in FIG. 3 for example the weight of the machine 25 will compensate for any play between the pin 128 and the holes 126 and 127.

The first coupling part 110 has a pair of aligned holes or bores 137 for receiving respective cam elements 138 and 139. The cam elements 138 and 139 constitute a cam generally indicated at 140 (FIG. 8). The cam elements 138 and 139 have respective cam faces 138' and 139'. As best shown in FIGS. 8 and 9, the cam faces 138' and 139' act against a round face 141 of the second coupling part 111. A socket-headed screw 142 passes through a hole or bore 143 in the cam element 139 and is threadably received in a threaded hole 144 in the cam element 138 as best shown for example in FIGS. 8, 13, and 14. By rotating the screw 142 in one direction the cam elements 138 and 139 move relatively toward each other in contact with the cam face 141, and by rotating the screw 142 in the opposite direction the cam elements 138 and 139 move relatively away from each other in contact with the cam face 141. Let it be assumed first that the machine 25 and its delaminator 38 and applicator roll 41 are inclined downwardly from the horizontal portion as in FIG. 4. Thus, by tightening the screw 142, the first coupling part 110 pivots in one direction about the pin 128 to bring the machine 25 and its delaminator 38 and its applicator roll 41 to the square or aligned position shown in FIG. 3. Next, let it be assumed that the machine 25 and its delaminator 38 and its applicator roll 41 are inclined upwardly from the horizontal position as in FIG. 5. Thus, by loosening the screw 142, the first coupling part 110 pivots in the opposite direction about the pin 128 to allow gravity to bring the machine 25 and its delaminator 38 and its applicator roll 41 to the square or aligned position shown in FIG. 3. In particular, when the screw 142 is turned in one direction to bring the cam elements 138 and 139 relatively toward each other, the first coupling element 110 pivots clockwise about the pivot pin 128 as viewed in FIG. 11. Conversely, when the screw 142 is turned in the opposite direction to allow the weight of the machine 25 to move the cam elements 138 and 139 apart, the first coupling element 110 pivots counterclockwise about the pivot pin 128 as viewed in FIG. 11.

The connector 125 is shown in FIGS. 7, 8 and 11 to be split to enable the connector 125 to be clamped onto the member 106 for example. The connector 125 has generally aligned flanges or bosses 145 and 146 having through holes 147 and 148. A socket-headed machine screw or bolt 149 passes through the holes 147 and 148 and is threadably received by a nut 150 which is non-rotatable in a socket-shaped portion of the hole 148. A washer 151 bottoms against a shoulder 152 in the hole 147. With the member 106 received in the connector 125 as shown in FIG. 6, the screw 149 can be tightened to clamp the connector 125 to the member 106. The space between the bosses 145 and 146 forms a slot 153 that opens into a hole 154 defined by the connector 125. The width of the slot 153 decreases as the screw 149 is tightened.

The pitches of the screws 121, 132, 136, 142 and 149 are such that these screws are self-locking so that they do not loosen even though there are vibrations from the machine 25.

A preferred way to assemble a machine such as the machine 25 onto the mounting structure 100, is to insert the pins 118 into the position shown in FIG. 6, and then to secure the first coupling part 110 to the frame 26 by threading the screw 121 into the frame 26 as best shown in FIG. 12. Next the second coupling part 111 can be attached to the first coupling part 110 by aligning the holes 127 with the holes 126 and inserting the pin 128 into the aligned holes 126 and 127. The cam elements 138 and 139 can be inserted into the holes 137 either before or after the pin 128 is inserted. If the cam elements are inserted into the holes 137 before the pin 128 is inserted into the holes 126 and 127, then the screw 142 can be passed through the cam element 139 and threaded to a certain extent into the cam element 138. Then the cam elements 138 and 139 and the screw 142 can be inserted into place in the holes 137. If, on the other hand, the pin 128 is first inserted into the hole 127, then the cam elements 138 and 139 can be inserted into their respective holes 137 and thereafter the screw 142 can be inserted through the hole 143 in the cam element 139 and then threaded into the threaded hole 144.

Then the screws 132 and 136 can be screwed into respective first and second coupling parts 110 and 111. If is the position of the cam elements 138 and 139 of the cam 140 in contact with the cam face 141 that defines the variable stop portion of the coupling 102 and hence of the machine 25. It generally requires only one person to left the machine 25 and the coupling 102 attached thereto to align the hole 154 in the connector 125 with the member 106 and then to slide the coupling 102 onto the member 106 to position shown in FIGS. 3 and 6. The screw 149 can then be tightened to secure the coupling 102 to the member 106. With the machine 25 now mounted onto the support structure 100, the screw 142 can be either tightened or loosened to bring the machine 25 and in particular the delaminator 38 and any applicator roll 41 into precise alignment or square with the articles to be labeled.

Although the machine 25 has been disclosed in relation to a conveyor 101, some applications do not require a conveyor. For example, the machine 25 can be oriented with respect to bottles at a bottling machine where labels are dispensed from the delaminator 38 directly onto bottles (not shown).

Although the expressions "first" and "second" have been used, it is only for the purpose of convenient reference and not in any way to limit the scope of the invention.

Other embodiments and modifications of the invention will suggest themselves to those skilled in the art, and all such of these as come within the spirit of this invention are included within its scope as best defined by the appended claims.

What is claimed is:

1. A coupling, comprising: a
  a first coupling element,
  a second coupling element,
  a pivot pin connecting the first and second coupling elements for pivotal movement relative to each other, and
  a cam to vary the amount of relative pivotal movement between the first and second coupling elements wherein the cam comprises a pair of relatively movable elements received in aligned holes in the first coupling element, and
  a screw acting on the cam elements to cause the cam elements to move selectively toward or away from each other.

2. A coupling as defined in claim 1, wherein the first coupling element comprises a clevis.

3. A coupling as defined in claim 1, wherein the first coupling part is generally U-shaped and includes a pair of arms and a bight portion connecting the arms, wherein the second coupling element includes a coupling portion disposed between the arms, the pivot pin extending through the coupling portion and into the arms, the cam being received by the first coupling part and acting on the second coupling part to define a selected stop position for the first and second coupling elements relative to each other.

4. A coupling as defined in claim 1, wherein the screw extends into both cam elements.

5. A coupling as defined in claim 3, wherein the arms having aligned holes to slidably receive the cam elements, wherein the screw is received in the cam elements, and wherein rotation of the screw in one direction causes the cam elements to move toward each other and rotation of the screw in the opposite direction enables the cam elements to move away from each other.

6. A coupling as defined in claim 1, wherein the second coupling element includes a cam surface cooperable with the cam elements.

7. A coupling as defined in claim 1, wherein the second coupling element includes a cam surface cooperable with the cam.

8. A coupling as defined in claim 7, including
  a structure to cantilever-mount the coupling, the structure being rigidly secured to the second coupling element, and
  a machine rigidly secured to the first coupling element.

9. A coupling as defined in claim 8, including a conveyor to carry items to be labeled, wherein the machine comprises a label applicator to apply labels to the items, and wherein the cam is operable to vary the inclination of the label applicator relative to the conveyor.

\* \* \* \* \*